US010755247B2

United States Patent
Olenoski et al.

(10) Patent No.: US 10,755,247 B2
(45) Date of Patent: Aug. 25, 2020

(54) CROWDFUNDING CREDIT CARD PAYMENTS

(71) Applicant: Capital One Services, LLC, McLean, VA (US)

(72) Inventors: Michelle S. Olenoski, Washington, DC (US); Dan Givol, Arlington, VA (US); Lukiih Cuan, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/210,173

(22) Filed: Dec. 5, 2018

(65) Prior Publication Data

US 2020/0184433 A1 Jun. 11, 2020

(51) Int. Cl.
| | |
|---|---|
| *G06Q 20/10* | (2012.01) |
| *G06Q 20/24* | (2012.01) |
| *G06Q 30/02* | (2012.01) |
| *G06Q 20/36* | (2012.01) |
| *G06Q 40/02* | (2012.01) |

(52) U.S. Cl.
CPC ........... *G06Q 20/102* (2013.01); *G06Q 20/24* (2013.01); *G06Q 20/363* (2013.01); *G06Q 30/0279* (2013.01); *G06Q 40/02* (2013.01)

(58) Field of Classification Search
CPC .............................. G06Q 20/102; G06Q 40/02
See application file for complete search history.

(56) References Cited

U.S. PATENT DOCUMENTS

| | | | | |
|---|---|---|---|---|
| 7,467,109 | B1 * | 12/2008 | Simon | G06Q 40/00 705/36 R |
| 8,209,194 | B1 * | 6/2012 | Nidy | G06Q 20/102 705/2 |
| 2009/0070247 | A1 * | 3/2009 | Simon | G06Q 40/00 705/35 |
| 2010/0306099 | A1 * | 12/2010 | Hirson | G06Q 20/10 705/38 |

(Continued)

FOREIGN PATENT DOCUMENTS

CN 105809541 A * 7/2016 ............. G06Q 40/04

OTHER PUBLICATIONS

Williams, Fred O., "Can you crowdfund your credit card debt online?", Oct. 5, 2018, Credit Cards (https://www.creditcards.com). (Year: 2018).*

(Continued)

*Primary Examiner* — Eric T Wong
(74) *Attorney, Agent, or Firm* — DLA Piper LLP (US)

(57) ABSTRACT

In one aspect, the present disclosure relates to a method for crowdfunding credit card payments. The method can include: analyzing a plurality of credit card accounts to determine a first account that is eligible for crowdfunding; transmitting a notification to a user device associated with an account holder of the first account, the notification prompting the account holder to authorize enabling receipt of crowdfunded payments for the first account; receiving, from the user device, authorization to enable receipt of crowdfund payments for the first account; providing, to one or more donors, electronic access to recent transaction information for the first account; receiving a payment from a first one of the donors; and applying the payment to the first account.

18 Claims, 6 Drawing Sheets

(56) References Cited

U.S. PATENT DOCUMENTS

| | | | | |
|---|---|---|---|---|
| 2011/0161155 A1* | 6/2011 | Wilhelm | ............ | G06Q 30/0226 |
| | | | | 705/14.27 |
| 2013/0232081 A1* | 9/2013 | Antoo | ..................... | G06Q 20/10 |
| | | | | 705/44 |
| 2014/0019283 A1* | 1/2014 | Daley | .................... | G06Q 30/06 |
| | | | | 705/26.2 |
| 2014/0195416 A1* | 7/2014 | Linscott | ............... | G06Q 20/023 |
| | | | | 705/39 |
| 2016/0110776 A1* | 4/2016 | Pratt | .................. | G06Q 30/0279 |
| | | | | 463/28 |
| 2017/0140473 A1* | 5/2017 | Liberman | ............ | G06Q 40/128 |
| 2019/0043138 A1* | 2/2019 | Blake | ..................... | G06Q 20/34 |

OTHER PUBLICATIONS

Finke, Michael. "Crowdfunding and peer lending: time to swim with the sharks?", ALM Media, LLC. Mar. 2016. (Year: 2016).*

Susan B. Garland, "Raise Money fro Personal Bills on Crowdfunding Sites," The Kiplinger Washington Editors, https://www.kiplinger.com/article/retirement/T065-C000-S004-crowdfunding-sites-to-pay-personal-bills.html, Oct. 2016, 5 pages.

Craig, et al., "Help the Craigs!," YouCaring, https://www.youcaring.com/mattcraignikkicraigsierracraigtaylorcraig-1034882, printed on May 22, 2018, 6 pages.

* cited by examiner

CROWDFUNDING CREDIT CARD PAYMENTS

BACKGROUND

Crowdfunding has been used to assist individuals and families that have financial hardship due to, for example, medical emergencies or natural disasters. Existing crowdfunding systems allow users ("donors") to browse crowdfunding campaigns and donate an arbitrary amount of money to campaigns of their choosing. Any money donated to a particular campaign may be distributed to the intended beneficiary as a check or electronic transfer. Thus, with existing crowdfunding systems, beneficiaries may be free to use donations however they choose and donors have no assurance as to how their donations are being used. Additionally, with existing campaigns donors are unable to verify need of a crowdfunding campaign based on actual transactions or incurred expenses of the campaign beneficiary.

SUMMARY

According to an aspect of the present disclosure, a computer-implemented method can include: analyzing a plurality of credit card accounts to determine a first account that is eligible for crowdfunding; transmitting a notification to a user device associated with an account holder of the first account, the notification prompting the account holder to authorize enabling receipt of crowdfunded payments for the first account; receiving, from the user device, authorization to enable receipt of crowdfund payments for the first account; providing, to one or more donors, electronic access to recent transaction information for the first account; receiving a payment from a first one of the donors; and applying the payment to the first account.

In some embodiments, analyzing the plurality of credit card accounts to determine that the first account is eligible for crowdfunding can include detecting that the first account has a balance greater than a predetermined threshold balance. In some embodiments, analyzing the plurality of credit card accounts to determine that the first account is eligible for crowdfunding may include determining that the first account is delinquent. In some embodiments, the method can include setting a flag on the first account indicating that crowdfunded payments have been authorized, responsive to receiving the authorization. In some embodiments, providing electronic access to recent transaction information may include providing access to information about credit card transactions dated within a predetermined time period. In some embodiments, the method can include retrieving the credit card transactions from a bank computer network. In some embodiments, providing electronic access to recent transaction information can include transmitting, to the one or more donors, a private uniform resource locator (URL) enabling electronic access to the recent transaction information.

In some embodiments, providing electronic access to recent transaction information may include providing electronic access to the recent transaction information on a crowdfunding website. In some embodiments, receiving the payment from the first donor may include receiving a request from a user device associated with the first donor, the request identifying a credit transaction from the plurality of credit transactions associated with the first account, wherein an amount of the payment from the first donor is associated with an amount of the credit transaction identified by the request. In some embodiments, receiving the payment from the first donor can include transferring funds from a bank account associated with the donor. In some embodiments, the method can include generating the recent transaction information by mapping a merchant identifier stored with the credit transaction to a merchant name and a merchant address.

According to another aspect of the present disclosure, a computer-implemented method may include: receiving, from a server, a notification prompting an account holder to authorize enabling receipt of crowdfunded payments for a first account, wherein the notification is received in response to the server analyzing a plurality of credit card accounts to determine the first account is eligible for crowdfunding; and in response to receiving input from the account holder, sending authorization to the server to enable receipt of crowdfund payments for the first account. In response to receiving the authorization, the server may be configured to: provide, to one or more donors, electronic access to recent transaction information for the first account, receive a payment from a first one of the donors, and apply the payment to the first account.

In some embodiments, the server can be configured to determine that the first account is eligible for crowdfunding comprises detecting that the first account has a balance greater than a predetermined threshold balance. In some embodiments, the server may be configured to determine that the first account is eligible for crowdfunding comprises determining that the first account is delinquent. In some embodiments, the recent transaction information can include information about credit card transactions dated within a predetermined time period. In some embodiments, sending authorization to the server to crowdfund payments for the first account may include sending authorization to the server to expose recent transaction information to users of a crowdfunding website. In some embodiments, sending authorization to the server to crowdfund payments for the first account can include sending authorization to the server to expose recent transaction information to select potential donors. In some embodiments, the server may be configured to transmit, to the one or more donors, a private uniform resource locator (URL) enabling electronic access to the recent transaction information.

According to another aspect of the present disclosure, a system may include: a processor and a non-volatile memory storing computer program code. When executed on the processor, the computer program code may cause the processor to execute a process operable to: analyze a plurality of credit card accounts to determine a first account that is eligible for crowdfunding; transmit a notification to a user device associated with an account holder of the first account, the notification prompting the account holder to authorize enabling receipt of crowdfunded payments for the first account; receive, from the user device, authorization to enable receipt of crowdfunded payments for the first account; provide, to one or more donors, electronic access to recent transaction information for the first account; receive a payment from a first one of the donors; and apply the payment to the first account.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure can be used to setup and run crowdfunding campaigns to help people lower their credit card balances. Credit card account holders can choose to be enrolled in a crowdfunding payments. In some embodiments, the disclosed systems and methods can automatically detect credit card accounts eligible for crowdfunded payments based on one or more heuristics, and then prompt the corresponding account holders for permission to be enrolled in a crowdfunding campaign. An account holder can choose to share information about their recent credit card transactions (e.g., transactions within the past ninety (90) days) with the general public or with selected persons. Donors can access a crowdfunding website or app to view information about the account holder including information about their recent credit card transactions. A donor can choose to pay for one or more individual transactions, or to enter a donation amount. The donations are directly applied to lower the credit card account balance, assuring donors of how their donations are being used.

The systems and methods disclosed herein could be used, for example, to help support planned events, such as parties, activities, philanthropic endeavors, etc. For example, a user deciding to perform some activity may fund the activity with their credit card account and seek donations from others. In some embodiments, the disclosed systems and methods can be used by an adult to help pay for a dependent child's routine expenses without having to assume credit liability.

Figure 1:
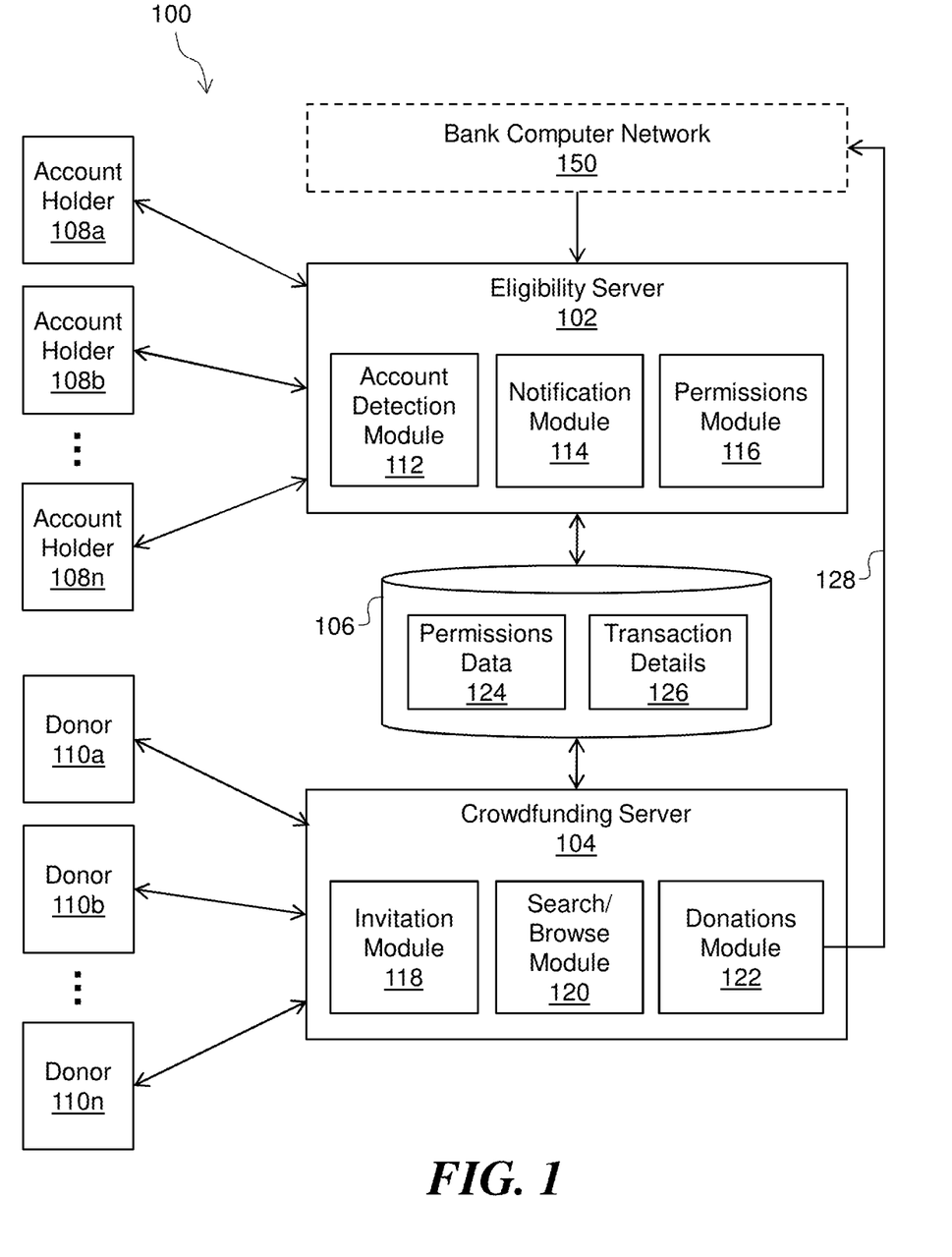
FIG. 1 is a block diagram of a system for crowdfunding credit card payments, according to some embodiments of the present disclosure.

FIG. 1 shows a system 100 for crowdfunding credit card payments, according to embodiments of the present disclosure. The illustrative system 100 can include an eligibility server 102, a crowdfunding server 104, a database 106, and a plurality of user devices. As shown, user devices can include a first plurality of user devices 108a, 108b . . . , 108n (108 generally) associated with account holders, and a second plurality of user devices 110a, 110b . . . , 110n (110 generally) associated with donors. User devices 108 may be referred to herein as "account holder user devices" 108 or simply "account holders" 108, and user devices 110 may be referred to as "donor user devices" 110 or simply "donors" 110. The various components of the system 100 may be connected as shown in FIG. 1 or in any other suitable manner. The system components may be connected by one or more wireless or wired computer networks. Database 106 may be any suitable type of database for storing data as described herein. For example, database 106 may be provided as a relational database or object database.

Eligibility server 102 can include account detection module 112, notification module 114, and permissions module 116. As used herein, the term "module" generally refers to a collection of hardware and/or software configured to perform and execute the processes, steps, or other functionality described in conjunction therewith.

Account detection module 112 may analyze information for a plurality of credit card accounts to detect accounts that are eligible to participate in crowdfunded payments. An account may be deeded eligible for crowdfunding based on one or more heuristics. In some embodiments, an account may be eligible if the account is deemed to be "at risk" or if the account holder is facing hardship. In some embodiments, a credit card account is determined to be eligible for crowdfunding if it is delinquent by 30, 60, or 90 days. In some embodiments, a credit card account is determined to be eligible if the account balance is greater than a predetermined threshold. In some embodiments, eligibility server 102 can utilize credit card data generated and/or stored by bank computer network 150 to identify accounts eligible for crowdfunding. For example, eligibility server 102 can (a) send a request to bank computer network 150 for data related to a particular credit card account, (b) analyze the data to formulate a risk score, and (c) use the score to determine if the account at risk and, thus, eligible. In some embodiments, eligible accounts may be detected based on previous interactions the account holder had with the bank, including customer service calls, online chat sessions, etc. In some embodiments, account detection module 112 may determine that an account is eligible for crowdfunding if the account holder lives in an area recently affected by a hurricane, flood, or other disaster. In some embodiments, account detection module 112 may determine that an account is eligible based on spending patterns, such as a pattern of transactions that exceed a threshold or an a relatively high number of medical-related transactions.

Notification module 114 can transmit a notification or alert to an account holder 108 if their credit card account is determined to be eligible for crowdfunding. The notification can prompt the account holder to enroll in crowdfunding to help pay down their account balance. Notification module 114 may transmit, for example, push notifications, text notifications, and email notifications. In response to receiving a notification, an account holder 108 may choose to authorize crowdfunded payments of their credit card account. In some embodiments, the account holder must allow information about their recent credit card transactions to be exposed in order to receive crowdfunded payments. An account holder 108 may choose to expose their recent transaction information to all users of a crowdfunding website/app, or only to select persons. For example, an account holder 108 may provide email addresses or other contact info for friends, family, or other persons with whom they want to share their recent transaction information (and thus receive donations from).

Permissions module 114 may be configured to manage crowdfunding permissions for one or more account holders. Permissions module 114 may maintain a flag for each account holder indicating whether the account holder has authorized crowdfunded payments. If an account holder chooses to share their recent transaction information with a select group of donors, permissions module 114 may associate those donors with the account holder. In some embodiments, crowdfunding permissions can be stored within database 106 (e.g., as permissions data 124).

In some embodiments, when an account holder enrolls in crowdfunded payments, eligibility server 102 may access the account holder's recent transaction information from bank computer network 150. In some embodiments, server 102 may copy transaction information from the bank computer network 150 into database 106, for example, into transaction details 126. In some embodiments, transaction details 126 may include, for each credit card transaction, a transaction date, merchant information, and a transaction amount. In some embodiments, system 100 may convert internal merchant identifiers used by the bank computer network 150 into a more "customer friendly" merchant information. For example, system 100 may use a database or service that maps internal merchant identifiers to merchant names, merchant addresses, and/or merchant phone numbers. This "customer friendly" merchant information may be displayed within a crowdfunding website or app.

In some embodiments, the system 100 may allow users to permit exposure of only certain transactions and/or certain categories of transactions. In some embodiments, users may permit varying level of detail to exposed for certain transactions/categories of transactions. In the case where a crowdfunding campaign is associated with a particular goal (e.g., a charity event or other cause), only transactions related to that goal may be exposed (or exposed in detail), whereas other non-related expenses may not be exposed or may be provided with very generic detail so as not to invade privacy. In some embodiments, the system 100 may recommend that certain transactions be exposed based on a determination that those transactions are related to the crowdfunding goal. For example, the system 100 may determine that transactions that are related to a goal based on when the transactions occurred or merchant codes associated with the transactions. In some embodiments, the system 100 may capture and/or store images of receipts for certain transactions and permit the user to expose these images to potential donors.

Account holder user devices 108 may include desktop computers, laptop computers, smartphones, tablets, or other computing devices configured to run user applications ("apps") and communicate with eligibility server 102. An app can be provided as a native application or a website accessed via a web browser on the user device 108. In some embodiments, an account holder user device 108 may be configured to run an app that communicates with eligibility server 102 to receive and display notifications to an account holder. For example, server 102 may transmit a notification to an app running on an account holder's device if it detects the account holder's credit card account is eligible for crowdfunding. The app may prompt the account holder to enroll in crowdfunded payments and for permission to expose their recent transaction information to donors 110. For example, in response to receiving a notification from the eligibility server 102, an app may prompt the account holder as follows: "Do you need help paying down your bill? Are you aware of the crowdfunding campaign to get support from your friends or the general public? Would you like to expose your bill details—and allow them to select which transactions to pay from the last 90 days?" The app may present one or more user interface (UI) controls to the account holder, allowing them to authorize crowdfunded payments and to select which donors 110 will have access to the account holder's recent transaction information. The app may transmit the account holder's crowdfunding permission information to permissions module 116. In some embodiments, the app may include UIs that are the same as or similar to UIs discussed below in the context of FIGS. 2A and 2B.

Crowdfunding server 104 can include an invitation module 118, a search module 120, and a donations module 122. In some embodiments, crowdfunding server 104 can include a web server configured to host a crowdfunding website accessible by user devices 108, 110.

Invitation module 118 may be configured to send crowdfunding invitations to select donors 110 with whom an account holder has chosen to expose their recent credit card transaction information. In some embodiments, invitation module 118 may generate a separate secure (or "private") Uniform Resource Locator (URL) for each selected donor 110 that allows the donor to access the account holder's information via a crowdfunding website or app. A private URL may include, for example, a cryptographically secure code or token that is validated by the system and that can only be used one time. Invitation module 118 may send the private URLs to respective donors via email, text message, etc. In some embodiments, invitation module 118 may query permissions data 124 to determine which invitations to send.

Search/browse module 120 can be configured to search and/or browse for account holders that have enrolled in crowdfunded payments. A donor user device 110 can send requests to search/browse module 120 to retrieve a list of account holders that have enrolled in crowdfunding, along with recent transaction information for those account holders. Search/browse module 120 can authenticate requests from donor user devices 110 to enforce an account holder's crowdfunding permissions. For example, if an account holder has chosen to share their transaction information only with donor 110a, search/browse module 120 will not expose any information about that account to unauthorized donor 110b. Conversely, if an account holder has chosen to share their recent transactions with all users of the crowdfunding website or app, then search/browse module 110 may provide the account holder's information to all donors 110. Search/browse module 120 may allow donors 110 to search for account holders using search criteria such as name, location, or current account balance. Search/browse module 120 may generate a list of account holders, including account holder names, locations, and the amount of money being sought by each account holder. In some embodiments, search/browse module 120 may be implemented within a crowdfunding website that allows donors to browse and search for account holders.

Donations module 122 can be configured to receive and process monetary donations from donors 110. A donation may be made to a particular credit card account and donations module 122 may directly apply the donation to that account to pay down its balance. In some embodiments, donations module 112 may send or transfer donations to bank computer network 150, as indicated by line 128. In some embodiments, a donation may be linked to or associated with a particular credit card transaction. For example, a donor 110 can select a particular transaction to pay for and amount of the donation will be associated with the amount of that transaction. Donations module 122 can support different methods of payments. For example, a donor 110 may send funds by linking a credit or debit card with the system 100. As another example, if donor 110 has an account with the bank computer network 150, a donation can be made by transferring funds from the donor's bank account to the credit card account associated with the crowdfunding campaign. In some embodiments, donations module 122 may allow donations to be made anonymously. In some embodiments, once a donor makes a donation for a particular transaction, that transaction may be hidden or disabled such that other donors cannot also donate for the same transaction. In some embodiments, if the amount of a donation is less than the associated transaction, the system may allow other people to donate the remaining amount of the transaction.

Donor user devices 110 can include desktop computers, laptop computers, smartphones, tablets, or other computing devices configured to run user applications ("apps") and communicate with the crowdfunding server 104. In some embodiments, a donor user device 110 may be configured to run a crowdfunding app or access a crowdfunding website. The app/website may include UIs for browsing eligible credit card account holders, viewing recent transaction information for at-risk account holders, and donating to at-risk account holders. A donor user device 110 may retrieve account holder information using search/browse module 120, according to some embodiments. A donor 110 can select a particular account holder to see information about the account holder's recent transactions (e.g., transactions within the past 90 days). A donor 110 can select particular transactions they want to pay for, or enter a monetary amount to donate. The app can send a request to donations module 122 to complete the donation. In some embodiments, the app can include UIs that are the same as or similar to UIs discussed below in the context of FIGS. 3A and 3B.

In some embodiments, eligibility server 102 and crowdfunding server 104 may be hosted or otherwise provided on the same physical or virtual server device(s). In some embodiments, eligibility server 102 and/or crowdfunding server 104 may be provided as part of the bank computer network 150. In some embodiments, one or more of server modules 112-122 may include an application programming interface (API) via which user devices 108, 110 can issue various types of requests such as those described above.

In some embodiments, eligibility server 102 and/or crowdfunding server 104 may be part of and hosted by a financial institution (e.g., Capital One) that provide the disclosed crowdfunding features to its account holders. For example, the servers 102, 104 may form a part of bank computer network 150 and, as such, may have direct access to transaction data processed by the bank computer network 150. In some embodiments, servers 102, 104 may use an API provided by the financial institution to retrieve account data.

FIGS. 2A, 2B, 3A, and 3B show UIs that may be used within a system for crowdfunding credit card payments (e.g., system 100 of FIG. 1), according to some embodiments of the present disclosure. The illustrative UIs may be implemented within an app configured to run on user devices (e.g., account holder devices 108 and/or donor user devices 110 of FIG. 1). In some embodiments, one or more of the UIs may be implemented by a crowdfunding website.

Figure 2A:
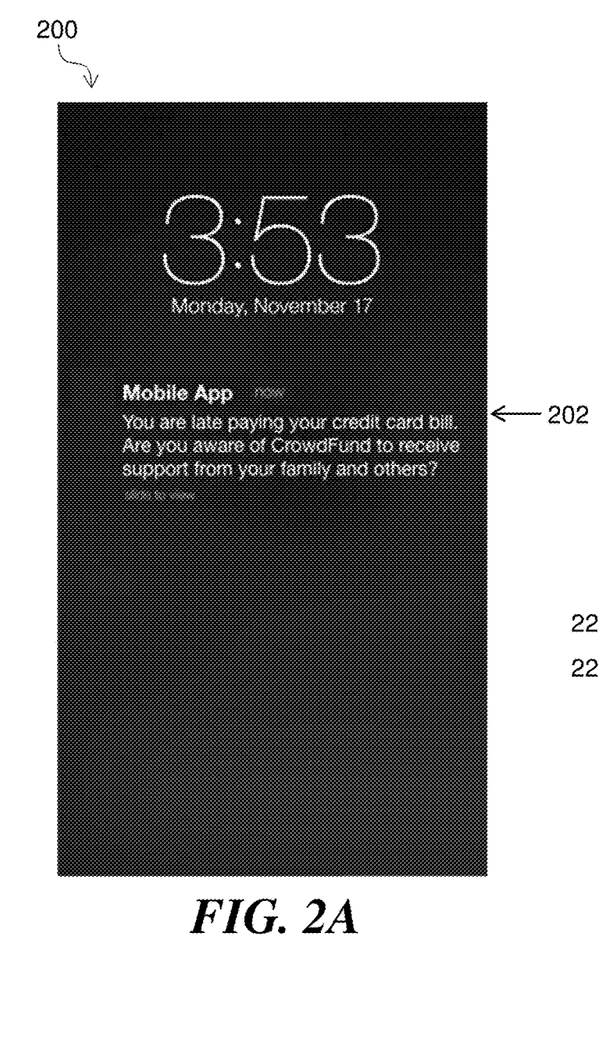
FIGS. 2A, 2B, 3A, and 3B show user interfaces (UIs) that may be used within a system for crowdfunding credit card payments, according to some embodiments of the present disclosure.

FIG. 2A shows a UI 200 that may be presented to an account holder, according to embodiments of the present disclosure. The illustrative UI 200 includes a notification 202. The notification 202 may be generated by an app running on the account holder's user device. In some embodiments, the app can periodically communicate with (i.e., poll) eligibility server for notifications associated with an account holder's credit card account(s). In some embodiments, eligibility server may "push" notifications to the account holder user device using, for example, text messaging. In some embodiments, the user device is configured to launch or open the app in response to a user clicking, tapping, or otherwise interacting with notification 202. In the example of FIG. 2A, notification 202 may be displayed to an account holder in response to the eligibility server 102 determining that the account holder's credit card account is eligible for crowdfunding.

Figure 2B:
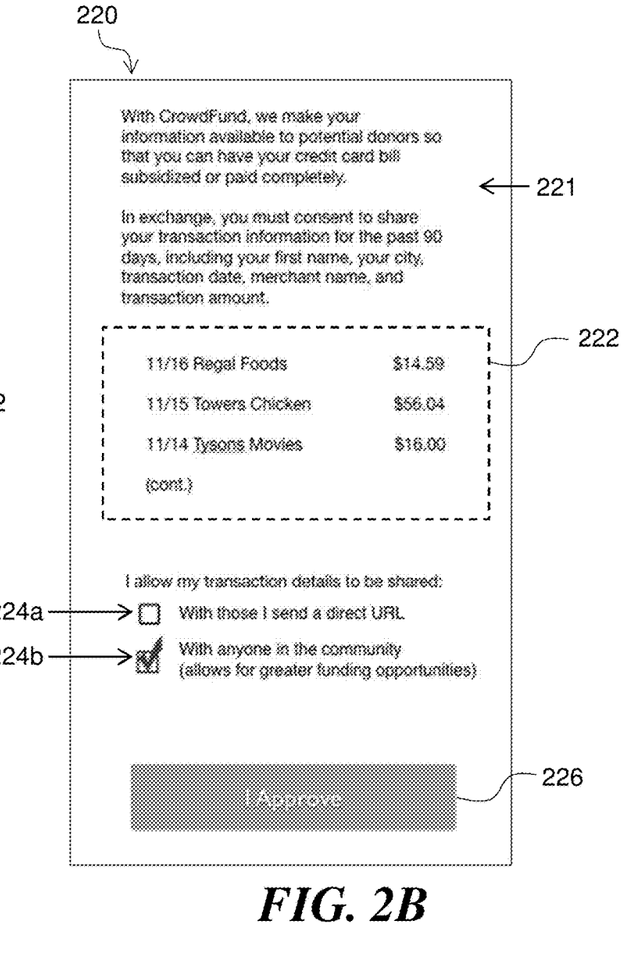

FIG. 2B shows another UI 220 that may be presented to an account holder, according to embodiments of the present disclosure. The UI 220 may be presented, for example, in response to the account holder interacting with notification 202 of FIG. 2A. The illustrative UI 200 can include an informational message 221, a transaction list 222, one or more permission controls 224a, 224b (224 generally), and an approval button 226. The transaction list 222 may include information about the account holder's recent credit card transactions. In the example shown in FIG. 2B, transaction information can include transaction date (e.g., "1/16"), merchant name (e.g., "Regal Foods"), and transaction amount (e.g., "$14.59"). In some embodiments, transaction information can include merchant address and/or phone number. Transaction list 222 can include, for example, information about the transactions within the past 30, 60, or 90 days. Permissions controls 224 can include, for example, a first control 224a indicating that recent transaction information should be exposed only to selected donors, and a second control 224b indicating the recent transaction information can be exposed to all users of a crowdfunding website/app. In some embodiments, UI 220 may require that at least one (or exactly one) of the permissions controls 224 is selected by the account holder. In response to the account holder clicking or tapping the approval button 226, the UI 220 or app may send a request to eligibility server 102 indicating that the user has authorized crowdfunded payments and indicating the selected permissions. In some embodiments, the app may include controls (not shown) to enable the account holder to enter email addresses or other contact information for one or more donors (e.g. prospective donors) with whom to share recent transaction information. In some embodiments, the app may include controls (not shown) to enable the account holder to enter a personalized message to be displayed to users of the crowdfunding website/app.

In some embodiments, transactions in the transaction list 222 may be grayed out, removed, or otherwise indicated as having received a payment after a donation has been received for the full amount of that transaction. If a donation is made less in less than the full amount of a transaction, a remaining amount may be displayed with or without some indication that the transaction has been partially paid for. In some embodiments, transaction list 222 can include transactions from multiple credit card accounts.

Figure 3A:
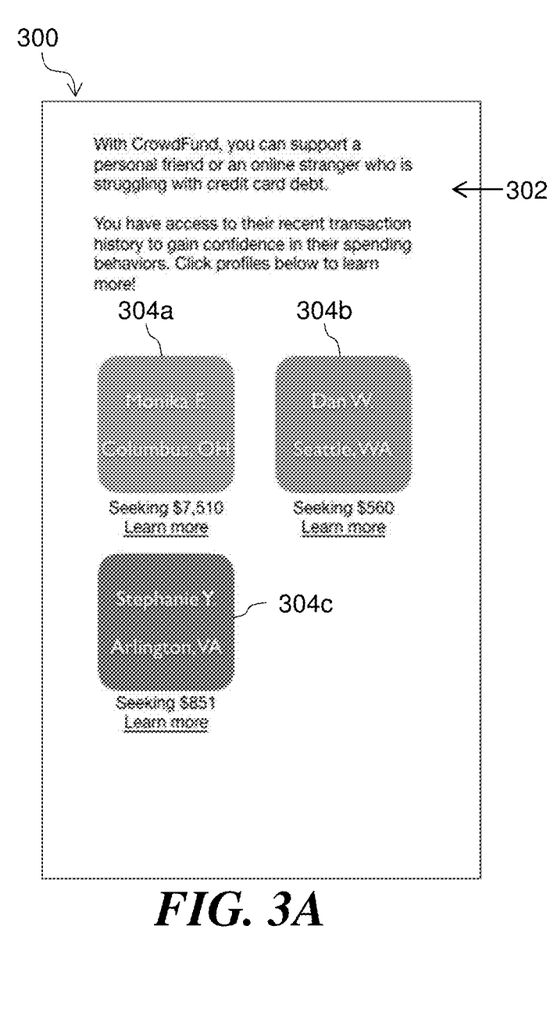

FIG. 3A shows a UI 300 that may be implemented within a crowdfunding website/app, according to embodiments of the present disclosure. UI 300 can allow a donor to browse information about eligible account holders that have authorized crowdfunding payments. The illustrative UI 302 can include an informational message 302 and a list of account holders 304a, 304b, 304c, etc. (304 generally). For each account holder 304, the UI 300 may include the account holder's name (e.g., "Monica F."), location (e.g., "Columbus, Ohio"), and the amount of money the account holder is seeking to have donated (e.g., "$7,510"). In some embodiments, the account holder's surname may be abbreviated to maintain privacy. The amount of money may be specified by the account holder or may be calculated based on the account holder's current balance. In some embodiments, UI 300 may be presented in response to a donor clicking on a private URL sent to them by the account holder (e.g., via email).

Figure 3B:
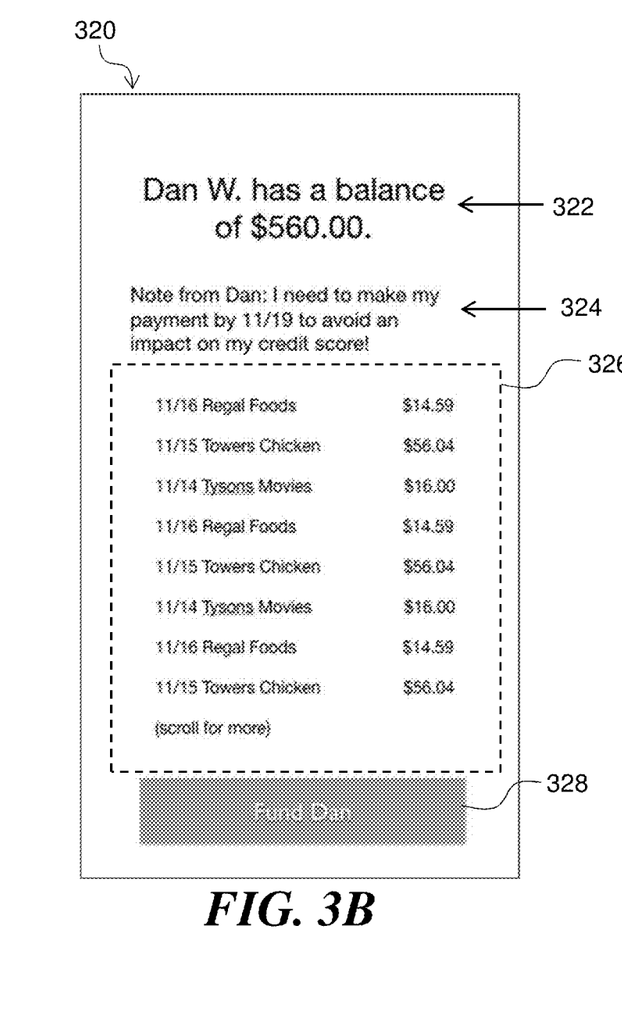

FIG. 3B shows another UI 320 that may be implemented within a crowdfunding website/app, according to embodiments of the present disclosure. UI 320 may be presented, for example, in response to a donor clicking or tapping an account holder 304 from UI of FIG. 3A. The illustrative UI 320 includes a balance display 322, a personalized message from the account holder 324, a list of recent transactions 326, and a donation button 328. A donor can scroll through the list of recent transactions 326, select a transaction to pay for, and then click/tap the donation button 328. In response, the UI 320 may send a donation request to the crowdfunding server 104 (FIG. 1). In some embodiments, the UI 320 may include controls (not shown) via which the donor can enter the amount of money to donate. In some embodiments, the UI 320 may include controls (not shown) to allow the donor to provide payment information use d for the donation.

Figure 4:
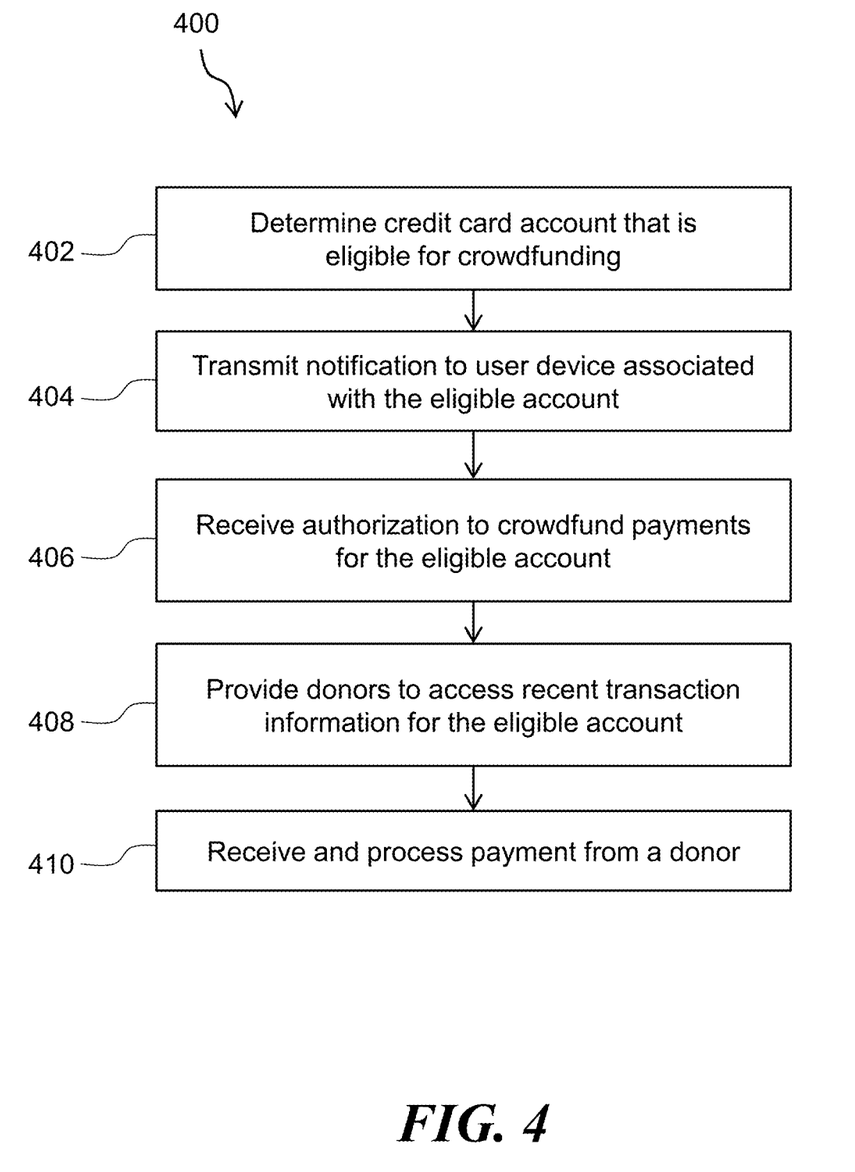
FIG. 4 is a flow diagram showing processing that may occur within a system for crowdfunding credit card payments, according to some embodiments of the present disclosure.

Referring to FIG. 4, a method 400 can be used for crowdfunding credit card payments, according to embodiments of the present disclosure. The illustrative method 400 may be implemented, for example, within the system 100 of FIG. 1.

At block 402, a plurality of credit card accounts can be analyzed to determine an account that is eligible for crowdfunding. In some embodiments, this includes determining if the account is delinquent, if the account has a balance greater than a predetermined threshold, or if the account is otherwise at-risk of default.

At block 404, a notification may be transmitted to a user device associated with the eligible account. For example, referring to FIG. 1, a notification may be transmitted from eligibility server 102 to an account holder user device 108. In some embodiments, the user device may prompt the account holder to authorize crowdfunded payments of their credit card. The user device may present a UI allowing the account holder to select which donors are to be granted access (i.e., visibility) to the account holder's recent credit card transactions (e.g., the general public versus select donors).

At block 406, an authorization to crowdfund payments can be received for the eligible account. In response, a flag may be set on the eligible account in indicating that crowdfunded payments have been authorized. In some embodiments, a server may update permissions data (e.g., data 124 in FIG. 1) in response to receiving authorization form the account holder.

At block 408, information about recent transactions for the eligible account may be provided to one or more donors. For example, if the account holder authorizes their transactions to be exposed to the general public, then the account holder's information may be made available to search and browse via a crowdfunding website or app. As another example, if the account holder chooses to expose their credit information with select donors, then private URLs may be emailed to those donors to allow access to the recent transaction information. In some embodiments, recent transaction information can include, for one or more transactions, a transaction date, a merchant name, and a transaction amount. In some embodiments, recent transactions may include transactions within the last ninety (90) days. In some embodiments, the merchant name may be generated by mapping an internal or "raw" merchant identifier associated with the credit transaction to a user-friendly merchant name and a merchant address.

At block 410, a payment may be received from a donor and applied to lower the balance of the eligible account. In some embodiments, a list of recent transactions may be presented to the donor and the donor may select one or more transactions to pay for. In some embodiments, the donor may enter the amount of the donation. In some embodiments, the system validates that the donation amount is less than or equal to the balance of the eligible account. In some embodiments, the donation may include a transfer of funds from a bank account associated with the donor (e.g., an account managed by bank computer network 150 of FIG. 1).

Figure 5:
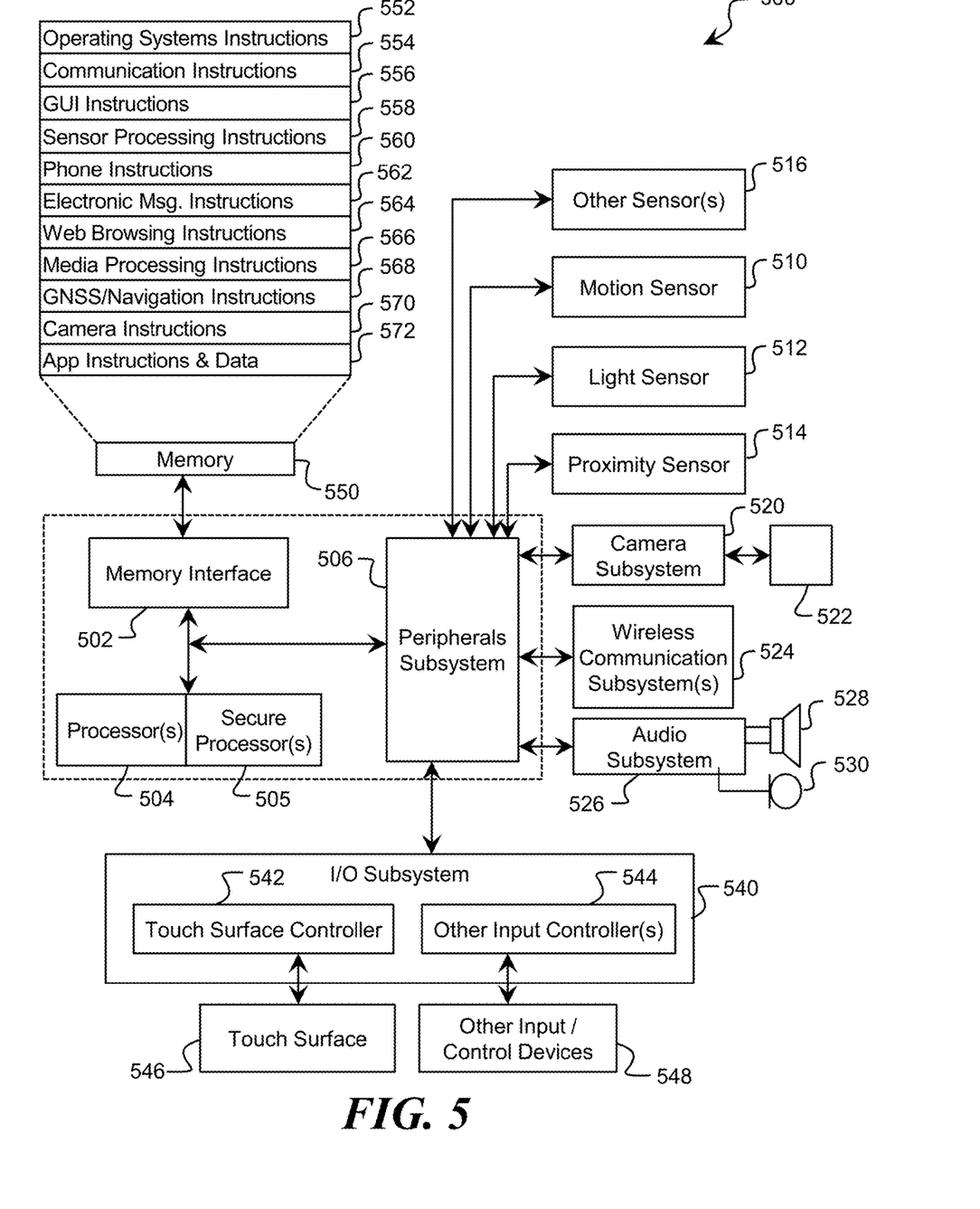
FIG. 5 is a block diagram of a user device, according to some embodiments of the present disclosure.

FIG. 5 shows a user device 500, according to an embodiment of the present disclosure. The illustrative user device 500 may include a memory interface 502, one or more data processors, image processors, central processing units 504, and/or secure processing units 505, and a peripherals interface 506. The memory interface 502, the one or more processors 504 and/or secure processors 505, and/or the peripherals interface 506 may be separate components or may be integrated in one or more integrated circuits. The various components in the user device 500 may be coupled by one or more communication buses or signal lines.

Sensors, devices, and subsystems may be coupled to the peripherals interface 506 to facilitate multiple functionalities. For example, a motion sensor 510, a light sensor 512, and a proximity sensor 514 may be coupled to the peripherals interface 506 to facilitate orientation, lighting, and proximity functions. Other sensors 516 may also be connected to the peripherals interface 506, such as a global navigation satellite system (GNSS) (e.g., GPS receiver), a temperature sensor, a biometric sensor, magnetometer, or other sensing device, to facilitate related functionalities.

A camera subsystem 520 and an optical sensor 522, e.g., a charged coupled device (CCD) or a complementary metal-oxide semiconductor (CMOS) optical sensor, may be utilized to facilitate camera functions, such as recording photographs and video clips. The camera subsystem 520 and the optical sensor 522 may be used to collect images of a user to be used during authentication of a user, e.g., by performing facial recognition analysis.

Communication functions may be facilitated through one or more wired and/or wireless communication subsystems 524, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 524. The specific design and implementation of the communication subsystems 524 may depend on the communication network(s) over which the user device 500 is intended to operate. For example, the user device 500 may include communication subsystems 524 designed to operate over a GSM network, a GPRS network, an EDGE network, a WiFi or WiMax network, and a Bluetooth™ network. For example, the wireless communication subsystems 524 may include hosting protocols such that the device 500 can be configured as a base station for other wireless devices and/or to provide a WiFi service.

An audio subsystem 526 may be coupled to a speaker 528 and a microphone 530 to facilitate voice-enabled functions, such as speaker recognition, voice replication, digital recording, and telephony functions. The audio subsystem 526 may be configured to facilitate processing voice commands, voiceprinting, and voice authentication, for example.

The I/O subsystem 540 may include a touch-surface controller 542 and/or other input controller(s) 544. The touch-surface controller 542 may be coupled to a touch surface 546. The touch surface 546 and touch-surface controller 542 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of the speaker 528 and/or the microphone 530.

In some implementations, a pressing of the button for a first duration may disengage a lock of the touch surface 546; and a pressing of the button for a second duration that is longer than the first duration may turn power to the user device 500 on or off. Pressing the button for a third duration may activate a voice control, or voice command, module that enables the user to speak commands into the microphone 530 to cause the device to execute the spoken command. The user may customize a functionality of one or more of the buttons. The touch surface 546 can, for example, also be used to implement virtual or soft buttons and/or a keyboard.

In some implementations, the user device 500 may present recorded audio and/or video files, such as MP3, AAC, and MPEG files. In some implementations, the user device 500 may include the functionality of an MP3 player, such as an iPod™. The user device 500 may, therefore, include a 36-pin connector and/or 8-pin connector that is compatible with the iPod. Other input/output and control devices may also be used.

The memory interface 502 may be coupled to memory 550. The memory 550 may include high-speed random access memory and/or non-volatile memory, such as one or more magnetic disk storage devices, one or more optical storage devices, and/or flash memory (e.g., NAND, NOR). The memory 550 may store an operating system 552, such as Darwin, RTXC, LINUX, UNIX, OS X, WINDOWS, or an embedded operating system such as VxWorks.

The operating system 552 may include instructions for handling basic system services and for performing hardware dependent tasks. In some implementations, the operating system 552 may be a kernel (e.g., UNIX kernel). In some implementations, the operating system 552 may include instructions for performing voice authentication.

The memory 550 may also store communication instructions 554 to facilitate communicating with one or more additional devices, one or more computers and/or one or more servers. The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 may store application (or "app") instructions and data 572, such as instructions for the apps described above in the context of FIGS. 1, 2A, 2B, 3A, and 3B.

Each of the above identified instructions and applications may correspond to a set of instructions for performing one or more functions described herein. These instructions need not be implemented as separate software programs, procedures, or modules. The memory 550 may include additional instructions or fewer instructions. Furthermore, various functions of the user device 500 may be implemented in hardware and/or in software, including in one or more signal processing and/or application specific integrated circuits.

In some embodiments, processor 504 may perform processing including executing instructions stored in memory 550, and secure processor 505 may perform some processing in a secure environment that may be inaccessible to other components of user device 500. For example, secure processor 505 may include cryptographic algorithms on board, hardware encryption, and physical tamper proofing. Secure processor 505 may be manufactured in secure facilities. Secure processor 505 may encrypt data/challenges from external devices. Secure processor 505 may encrypt entire data packages that may be sent from user device 500 to the network. Secure processor 505 may separate a valid user/external device from a spoofed one, since a hacked or spoofed device may not have the private keys necessary to encrypt/decrypt, hash, or digitally sign data, as described herein.

Figure 6:
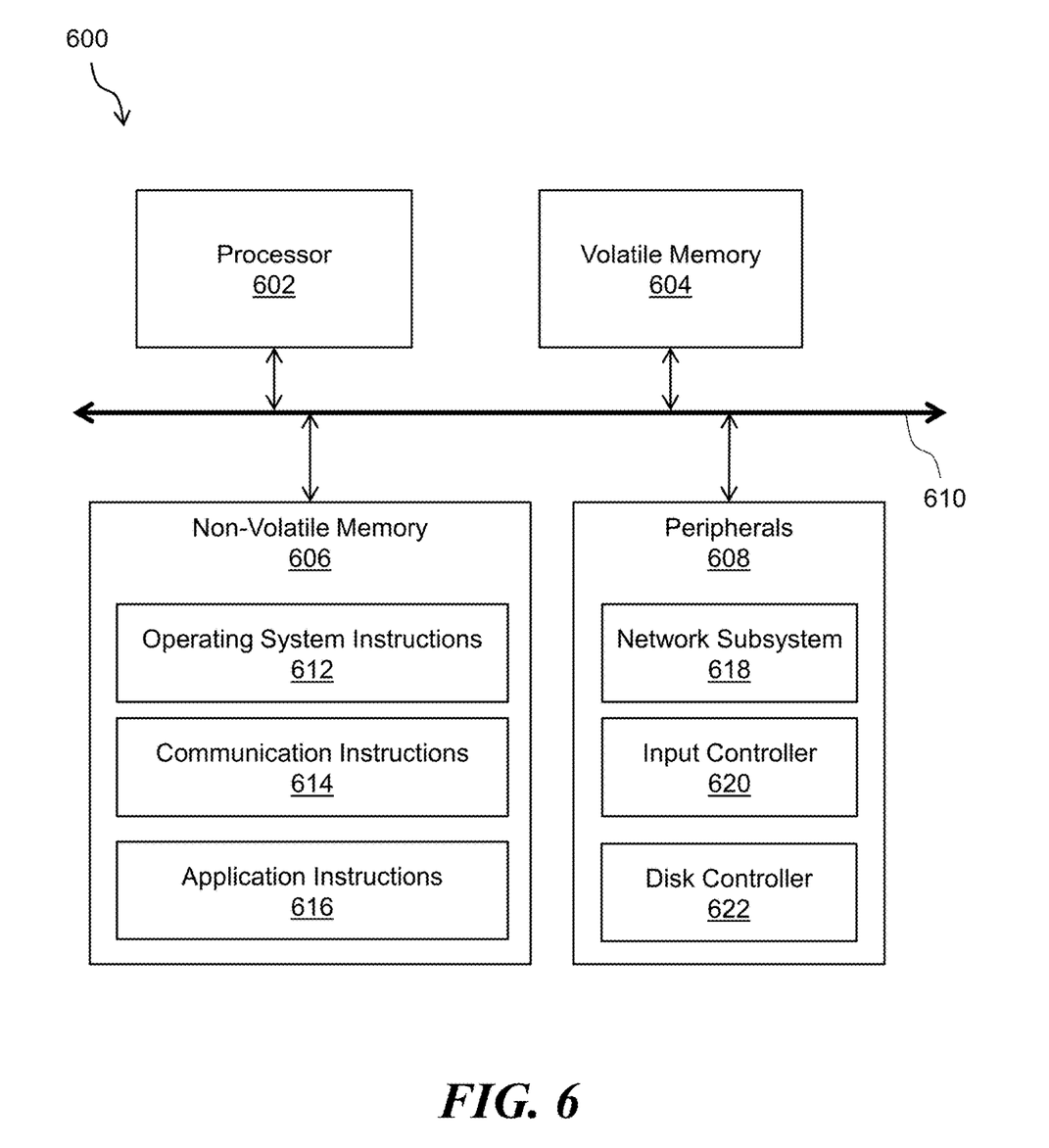
FIG. 6 is a block diagram of a server device, according to some embodiments of the present disclosure.

FIG. 6 shows an illustrative server device 600 that may implement various features and processes as described herein. The server device 600 may be implemented on any electronic device that runs software applications derived from compiled instructions, including without limitation personal computers, servers, smart phones, media players, electronic tablets, game consoles, email devices, etc. In some implementations, the server device 600 may include one or more processors 602, volatile memory 604, non-volatile memory 606, and one or more peripherals 608. These components may be interconnected by one or more computer buses 610.

Processor(s) 602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 610 may be any known internal or external bus technology, including but not limited to ISA, EISA, PCI, PCI Express, NuBus, USB, Serial ATA or FireWire. Volatile memory 604 may include, for example, SDRAM. Processor 602 may receive instructions and data from a read-only memory or a random access memory or both. The essential elements of a computer may include a processor for executing instructions and one or more memories for storing instructions and data.

Non-volatile memory 606 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 may store various computer instructions including operating system instructions 612, communication instructions 614, and application instructions 616. Operating system instructions 612 may include instructions for implementing an operating system (e.g., Mac OS®, Windows®, or Linux). The operating system may be multi-user, multi-processing, multitasking, multithreading, real-time, and the like. The communication instructions 614 may include network communications instructions, for example, software for implementing communication protocols, such as TCP/IP, HTTP, Ethernet, telephony, etc. Application instructions 616 can include instructions for crowdfunding credit card payments as described herein. For example, application instructions 616 may include instructions for modules 112-122 described above in conjunction with FIG. 1.

Peripherals 608 may be included within the server device 600 or operatively coupled to communicate with the sever device 600. Peripherals 608 may include, for example, network interfaces 618, input devices 620, and storage devices 622. Network interfaces may include for example an Ethernet or WiFi adapter. Input devices 620 may be any known input device technology, including but not limited to a keyboard (including a virtual keyboard), mouse, track ball, and touch-sensitive pad or display. Storage devices 622 may include one or more mass storage devices for storing data files; such devices include magnetic disks, such as internal hard disks and removable disks; magneto-optical disks; and optical disks.

Methods described herein may represent processing that occurs within a system for crowdfunding credit card payments (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computer-implemented method comprising:
analyzing a plurality of credit card accounts to determine a first account that is eligible for crowdfunding;
transmitting a notification to a user device associated with an account holder of the first account, the notification prompting the account holder to authorize enabling receipt of crowdfunded payments for the first account;
receiving, from the user device, authorization to enable receipt of crowdfund payments for the first account from one or more selected donors;
generating, for each of the one or more selected donors, a unique secure uniform resource locator (URL) that allows each of the one or more selected donors to access information associated with the first account;
receiving, from a computing device associated with at least one donor of the one or more selected donors, a hypertext transfer protocol (HTTP) request based on the secure URL generated for the at least one donor;
identifying a cryptographically secure token contained in the HTTP request, wherein the cryptographically secure token is a single use token;
responsive to the identifying, providing, to the at least one donor, a user interface allowing the at least one donor to view a plurality of credit transactions associated with the first account eligible for crowdfunding via the user interface;
receiving, via the user interface, a request to make a payment from the computing device associated with the at least one donor, the request identifying a credit transaction from the plurality of credit transactions associated with the first account, wherein an amount of the payment from the first donor is associated with an amount of the credit transaction identified by the request;

applying the payment to the first account; and updating the user interface to visually illustrate that payment for the credit transaction from the plurality of credit transactions has been received.

2. The computer-implemented method of claim 1 wherein analyzing the plurality of credit card accounts to determine that the first account is eligible for crowdfunding comprises:

detecting that the first account has a balance greater than a predetermined threshold balance.

3. The computer-implemented method of claim 1 wherein analyzing the plurality of credit card accounts to determine that the first account is eligible for crowdfunding comprises:

determining that the first account is delinquent.

4. The computer-implemented method of claim 1 further comprising:

setting a flag on the first account indicating that crowdfunded payments have been authorized, responsive to receiving the authorization.

5. The computer-implemented method of claim 1 wherein the plurality of credit transactions comprises information about credit card transactions dated within a predetermined time period.

6. The computer-implemented method of claim 5 further comprising:

retrieving the credit card transactions from a bank computer network.

7. The computer-implemented method of claim 1 wherein providing, to the at least one donor, the user interface comprises:

providing electronic access to recent transaction information on a crowdfunding website.

8. The computer-implemented method of claim 1 wherein receiving the payment from the first donor comprises:

transferring funds from a bank account associated with the donor.

9. The computer-implemented method of claim 1 further comprising:

generating the recent transaction information by mapping a merchant identifier stored with the credit transaction to a merchant name and a merchant address.

10. A computer-implemented method comprising:

receiving, from a server, a notification prompting an account holder to authorize enabling receipt of crowdfunded payments for a first account, wherein the notification is received in response to the server analyzing a plurality of credit card accounts to determine the first account is eligible for crowdfunding; and in response to receiving input from the account holder, sending authorization to the server to enable receipt of crowdfund payments for the first account, wherein in response to receiving the authorization, the server is configured to:

generate, for one or more donors, a unique secure uniform resource locator (URL) that allows each of the one or more donors to access information associated with the first account;

receive, from a computing device associated with at least one donor of the one or more donors, a hypertext transfer protocol (HTTP) request based on the secure URL generated for the at least one donor;

identify a cryptographically secure token contained in the HTTP request, wherein the cryptographically secure token is a single use token;

responsive to identifying the cryptographically secure token, generate a user interface allowing the at least one donor to browse information about the first account eligible for the crowdfunding, the user interface comprising an aggregate transaction amount for the crowdfunding, provide, to the at least one donor, electronic access to information about the first account eligible for crowdfunding via the user interface, upon receiving an indication, via the user interface from the at least one donor, for further information about the first account, generate a further user interface comprising a list of recent transactions, provide, to the at least one donor, electronic access to recent transaction information for the first account, receive, via the further user interface, a request to make a payment from a user device associated with the at least one donor, the request identifying a credit transaction from a plurality of credit transactions associated with the first account, wherein an amount of the payment from the first donor is associated with an amount of the credit transaction identified by the request;

apply the payment to the first account, and update the further user interface to visually illustrate that payment for the credit transaction from the plurality of credit transactions has been received.

11. The computer-implemented method of claim 10 wherein the server is configured to determine that the first account is eligible for crowdfunding comprises detecting that the first account has a balance greater than a predetermined threshold balance.

12. The computer-implemented method of claim 10 wherein the server is configured to determine that the first account is eligible for crowdfunding comprises determining that the first account is delinquent.

13. The computer-implemented method of claim 10 wherein the recent transaction information comprises information about credit card transactions dated within a predetermined time period.

14. The computer-implemented method of claim 10 wherein sending authorization to the server to crowdfund payments for the first account comprises sending authorization to the server to expose the recent transaction information to users of a crowdfunding website.

15. The computer-implemented method of claim 10 wherein sending authorization to the server to crowdfund payments for the first account comprises sending authorization to the server to expose the recent transaction information to select potential donors.

16. A system comprising:

a processor; and a non-volatile memory storing computer program code that when executed on the processor causes the processor to execute a process operable to:

analyze a plurality of credit card accounts to determine a first account that is eligible for crowdfunding;

transmit a notification to a user device associated with an account holder of the first account, the notification prompting the account holder to authorize enabling receipt of crowdfunded payments for the first account;

receive, from the user device, authorization to enable receipt of crowdfunded payments for the first account from one or more selected donors;

generate, for each of the one or more selected donors, a unique secure uniform resource locator (URL) that allows each of the one or more selected donors to access information associated with the first account;

receive, from a computing device associated with at least one donor of the one or more selected donors, a hypertext transfer protocol (HTTP) request abased on the secure URL generated for the at least one donor;

identify a cryptographically secure token contained in the HTTP request, wherein the cryptographically secure token is a single use token;

responsive to identify the cryptographically secure token, generate a user interface allowing the at least one donor to browse information about the first account eligible for the crowdfunding, the user interface comprising an aggregate transaction amount for the crowdfunding, provide, to the at least one donor, electronic access to information about the first account eligible for crowdfunding via the user interface, upon receiving an indication, via the user interface from the at least one donor, for further information about the first account, generate a further user interface comprising a list of recent transactions;

provide, to the at least one donor, electronic access to recent transaction information for the first account, wherein the recent transaction information is generated by mapping a merchant identifier stored with the credit transaction to a merchant name and a merchant address;

receive a payment from the at least one donors for a particular transaction in the list of recent transactions;

apply the payment to the first account; and update the further user interface to visually illustrate the payment for the particular transaction from the list of recent transactions.

17. The system of claim 16 wherein the computer code, when executed on the processor, causes the processor to execute a process operable to provide electronic access to the recent transaction information on a crowdfunding website.

18. The system of claim 16 wherein the computer code, when executed on the processor, causes the processor to execute a process operable to receive a request to make a payment from a user device associated with a first one of the donors, the request identifying a credit transaction from the plurality of credit transactions associated with the first account, wherein an amount of the payment from the first donor is associated with an amount of the credit transaction identified by the request.

* * * * *